US008172205B2

(12) United States Patent
Bresolin et al.

(10) Patent No.: US 8,172,205 B2
(45) Date of Patent: May 8, 2012

(54) ROTATING AERATOR FOR AQUARIUMS AND PONDS

(75) Inventors: Valerio Bresolin, Vicenza (IT); Luigi Signori, Vicenza (IT)

(73) Assignee: Hydor SRL, Vicenza (IT)

( * ) Notice: Subject to any disclaimer, the term of this patent is extended or adjusted under 35 U.S.C. 154(b) by 1038 days.

(21) Appl. No.: 11/568,216

(22) PCT Filed: Nov. 4, 2004

(86) PCT No.: PCT/IT2004/000607
§ 371 (c)(1),
(2), (4) Date: Oct. 23, 2006

(87) PCT Pub. No.: WO2005/102037
PCT Pub. Date: Nov. 3, 2005

(65) Prior Publication Data
US 2007/0251865 A1 Nov. 1, 2007

(30) Foreign Application Priority Data
Apr. 22, 2004 (IT) .............................. VE2004A0015

(51) Int. Cl.
*B01F 3/04* (2006.01)
(52) U.S. Cl. .......................................... 261/91; 261/93
(58) Field of Classification Search .................... 261/84, 261/91, 93
See application file for complete search history.

(56) References Cited

U.S. PATENT DOCUMENTS

| 1,526,596 | A | * | 2/1925 | Greenawalt | 261/93 |
| 1,976,956 | A | * | 10/1934 | MacLean | 261/93 |
| 2,865,618 | A | * | 12/1958 | Abell | 261/93 |
| 3,189,334 | A | | 6/1965 | Bell | |
| 3,557,753 | A | * | 1/1971 | Dantoni | 119/260 |
| 3,559,964 | A | * | 2/1971 | Sell et al. | 261/91 |
| 4,029,724 | A | * | 6/1977 | Muller et al. | 264/87 |
| 4,235,720 | A | * | 11/1980 | Nakajima et al. | 210/220 |
| 4,265,739 | A | * | 5/1981 | Dalton | 209/169 |

(Continued)

FOREIGN PATENT DOCUMENTS
WO 00/41802 7/2000

OTHER PUBLICATIONS
International Search Report Issued in the Corresponding Application PCT/IT2004/000607, Completed Jun. 3, 2005 and Mailed Oct. 6, 2005.

(Continued)

*Primary Examiner* — Charles Bushey
(74) *Attorney, Agent, or Firm* — Griffin & Szipl, P.C.

(57) ABSTRACT

In an aerator (10) for aquariums and ponds there is an impeller (60) operated by an electric motor (20) having a first entry (246, 347) for the intake of water, a second entry (44) for the intake of air and an exit (254) where the water and air flow comes out, the impeller (60), when it is operated, sucks water from said first entry (246, 347), creates a lower pressure which sucks air from said second entry (44) and mixes said sucked air with water generating a flow which comes out from the exit (254).

17 Claims, 10 Drawing Sheets

U.S. PATENT DOCUMENTS

| | | | | |
|---|---|---|---|---|
| 4,333,834 | A | * | 6/1982 | Werner .......... 210/219 |
| 5,211,469 | A | * | 5/1993 | Matthias et al. ........ 362/101 |
| 5,213,718 | A | * | 5/1993 | Burgess .......... 261/93 |
| 5,275,123 | A | * | 1/1994 | Geung .......... 119/263 |
| 5,385,443 | A | * | 1/1995 | Dufour .......... 415/116 |
| 5,582,777 | A | | 12/1996 | Vento |
| 5,643,503 | A | * | 7/1997 | Roland .......... 261/30 |
| 6,072,255 | A | | 6/2000 | Chiang |
| 6,270,061 | B1 | * | 8/2001 | Bouquet et al. ........ 261/87 |
| 6,308,834 | B1 | * | 10/2001 | Peaker et al. ........ 209/169 |
| 6,394,423 | B1 | * | 5/2002 | Vento .......... 261/29 |
| 6,520,490 | B1 | * | 2/2003 | Erickson .......... 261/93 |
| 6,712,980 | B1 | * | 3/2004 | Ahlstrom .......... 210/758 |
| 6,736,377 | B1 | * | 5/2004 | Chien .......... 261/93 |

OTHER PUBLICATIONS

Collins English Dictionary, p. 778, 1994.
Webster's Ninth New Collegiate Dictionary, pp. 603, 655, and 1025 (1990).
Random House Webster's College Dictionary p. 869 (1991).
Collins English Dictionary (3rd Ed.) p. 1001 (1994).

\* cited by examiner

ROTATING AERATOR FOR AQUARIUMS AND PONDS

This is a National Phase Application in the United States of International Patent Application No. PCT/IT2004/000607 filed Nov. 4, 2004, which claims priority on Italian Patent Application No. VE2004A000015, filed Apr. 22, 2004. The entire disclosures of the above patent applications are hereby incorporated by reference.

FIELD OF THE INVENTION

The present invention relates to an aerator for acquarium or pond in order to put air into an aquarium or pond.

BACKGROUND OF THE INVENTION

The main aim of an aerator is to supply new air into the water contained in an aquarium or pond with a new amount of oxygen. Air put into the aquarium rises, so moving water and thus creating a more efficient vertical circulation and gas exchange on the water surface. It is also to be noted the pleasant visual effect which the flow of air bubbles produces by rising up to the water surface.

A first kind of aerators of the prior art are made up of an alternative pump with a membrane, that is a casing wherein there is a membrane alternatively moved by an electromagnet fed by alternating current. On the casing, there is an intake to be connected to a sucking duct in order to suck air and an outlet to be connected to a delivery duct where air under pressure comes out. The alternative movement of the membrane allows for the air to be sucked from the intake and to send it to the delivery duct. The aerator and the sucking duct are positioned outside the aquarium and only the end portion of the delivery duct is immersed inside the aquarium where, at its end, a porous stone is mounted which allows for the air to spread out, so forming many bubbles which rise towards the water surface.

These aerators of the prior art have many drawbacks. In fact, due to the principle of functioning which is of an alternative kind, vibrations originate and they stress the aerator, so reducing its life time. Moreover, vibrations cause noises and, more precisely, a buzzing which can be very troublesome. The membrane of the aerator continuously vibrates and it is always stressed, therefore it breaks often. Furthermore, air which comes out from the delivery duct through the porous stone, continuously leaves substances into the micro-porosity of the stone which, in a short time and easily, block the delivery duct. Unfortunately, also the valves for the operating of the aerator are liable to damages and they easily fail, thus stopping the functioning of the aerator.

This kind of aerator is complicated in construction since it is made by many components, some of them complex and continuously stressed. It is to be noted that a similar aerator necessitates a long time for construction and high costs. In addition its reliability is very low since it often breaks or malfunctions.

There is a second kind of aerator which use the so-called "Venturi effect", that is, devices which pump water inside a duct wherein there is a narrowing section connected to a duct for the intake of water. Near the narrowing section, due to the "Venturi effect", the lower pressure is created, air is sucked and mixed with water and then ejected from the aerator. Also this aerator has some drawbacks due to the fact that the created lower pressure is little, the mixing of air with water is noisy and the dimension of air bubbles are, on the average, very big.

Finally, there exist pumps for aquariums comprising a centrifugal impeller, operated by an electric motor, having a duct for sucking water and a delivery duct. At the sucking duct a passage is made for the intake of air so that, during the operating of the pump and thanks to the lower pressure created by the pump, air is drawn in, mixed with water, and then ejected through the delivery duct. This device is actually a pump, where the main aim is to draw water from an aquarium in order to filter it, and then to re-introduce the water into the aquarium. The water sucked from the pump creates a flow of bubbles, but this flow is very little, thereby it has only an aesthetical effect: in fact, the device is a pump and not an aerator. In conclusion, although the flow of bubbles is visible, it is absolutely insufficient for aerating and/or oxygenating water contained in an aquarium. Moreover, this device, during the functioning, also produces noises which cause nuisance.

Furthermore, the water and air flow which comes out from the aerator has a random orientation, thereby the aesthetical result of the air bubbles which rises towards the water surface is not sufficient in order to create an agreeable visual effect. This aerator is positioned near the water surface and then, the air bubbles, which are drawn by the movement of water, come out quickly and not in the depth.

The aim of the invention is to make an aerator wherein all the drawbacks cited with reference to the prior art described above, are overcome. In particular, it is required a noiseless aerator, free from vibrations. Moreover, it has to produce a more efficient air flow requiring less power. The air flow created has to form a flow of bubbles which rises upwards, so to create a pleasant visual effect. The aerator has to be simple in construction, with few components and it has to be reliable.

SUMMARY OF THE INVENTION

These aims are reached by an aerator for aquariums and ponds comprising an impeller for pumping water having a rotation axis and provided with a hub from which a plurality of blades extend, motor means for operating said impeller, a first entry for the intake of water in said impeller, a second entry for the intake of air and an exit where the water and air flow comes out from said impeller, said impeller, when it is operated, sucks water from said first entry, creates a lower pressure which sucks air from said second entry, mixes said sucked air with water which come out from said exit, characterized in that said second entry for the intake of air is positioned in an area between said rotation axis of said impeller and the peripheral end of said plurality of blades. Therefore, the air and water flow is generated by an impeller having a uniform and regular rotary movement and the mixing of water and air occurs just in the impeller, whereby the functioning of the aerator is noiseless and without vibrations. Preferably, said second entry for the intake of air is positioned in an area comprised between said rotation axis and said hub of said impeller, and in particular in said hub there are holes so as to connect the inside of said hub with the space defined between the blades, the inside of said hub is connected to said second entry for the intake of air, so that, as said impeller rotates, air is drawn inside said hub from said second entry by lower pressure, passes through said holes and comes out from said impeller through said exit together with the sucked water.

In this way the aerator is very simple and made up of few components which are simple and not liable to breakages. The aerator is then reliable and of low cost. This aerator comprises also a conveying element which surrounds said impeller onto which said exit, where the water and air flow comes out, is made, said conveying element at said exit being provided with a deflector so as to deviate the water and air flow which comes out from said impeller from a direction essentially perpendicular to said rotation axis to a direction comprised between said axis of rotation and the direction perpendicular to said rotation axis. Consequently, by placing the aerator inside the aquarium with the axis of the impeller vertically positioned, the flow creates a cone of bubbles which rises towards the water surface, so generating inside the aquarium a pleasant vision. This aerator also comprises a lighting device for said flow of bubbles, so creating a flow of coloured bubbles which rises up towards the water surface.

BRIEF DESCRIPTION OF THE DRAWINGS

These and other advantages of the invention will be more evident from the following detailed description of some embodiments, given only for illustrative and non limitative purposes, made with reference to the subsequent drawings, wherein.

DETAILED DESCRIPTION OF THE INVENTION

In FIGS. 1 to 4, with reference 10 an aerator is entirely indicated. The aerator 10 comprises in turn: an electric motor 20 onto which a channelling element 40 is mounted, an impeller 60 positioned over the channelling element 40, a protective cage 80 for the impeller 60, a support element 100 for the impeller 60 and, at last, a lighting device 120 placed over the support element 100. The electric motor 20 comprises a casing 22 inside which a stator 24 and a rotor 26 are housed. The rotor 26 is mounted onto a pin 28 which has a first end 28a supported by the casing 22 and a second end 28b which comes out from the casing 22 onto which the impeller 60 is mounted, so defining the rotation axis of the impeller 60. The channelling element 40 is mounted onto the casing 22 on the side where the second end 28b of the pin 28 comes out; the channelling element 40 is lid-shaped and comprises a cylindrical wall 40a coaxial with respect to the pin 28 and a circular wall 40b trasversely arranged with respect to the pin 28. An opening which forms an air intake 42 is made on the cylindrical wall 40a of the channelling element 40, whereas a cylindrical opening 44 is made on the circular wall 40b of the channelling element 40 in the central and axial position. The cylindrical opening 44 forms a passage where the second end 28b of the pin 28 projects out and air, entered through the air intake 42, comes out.

The impeller 60 is mounted onto the second end 28b of the pin 28 near the circular wall 40b of the channelling element 40. As better shown in FIG. 5, the impeller 60 comprises a circular hub 62 from which a plurality of flat blades 64 extend radially. For a proper functioning, it is preferable that the blades 64 are in a number greater than 10; for example in the figures have been represented 24 blades.

Figure 1:
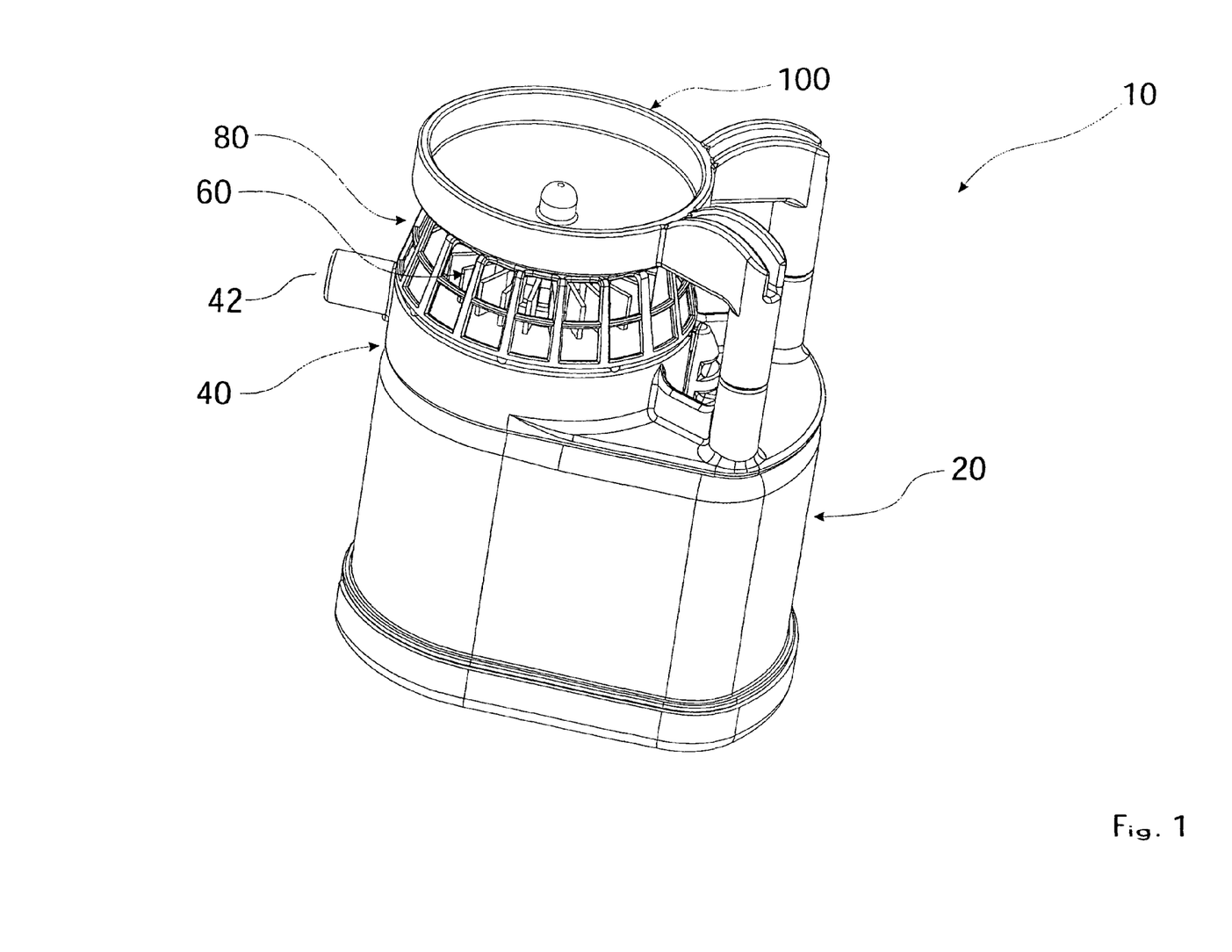
FIG. 1 is a perspective view of an aerator according to the present invention.
Figure 2:
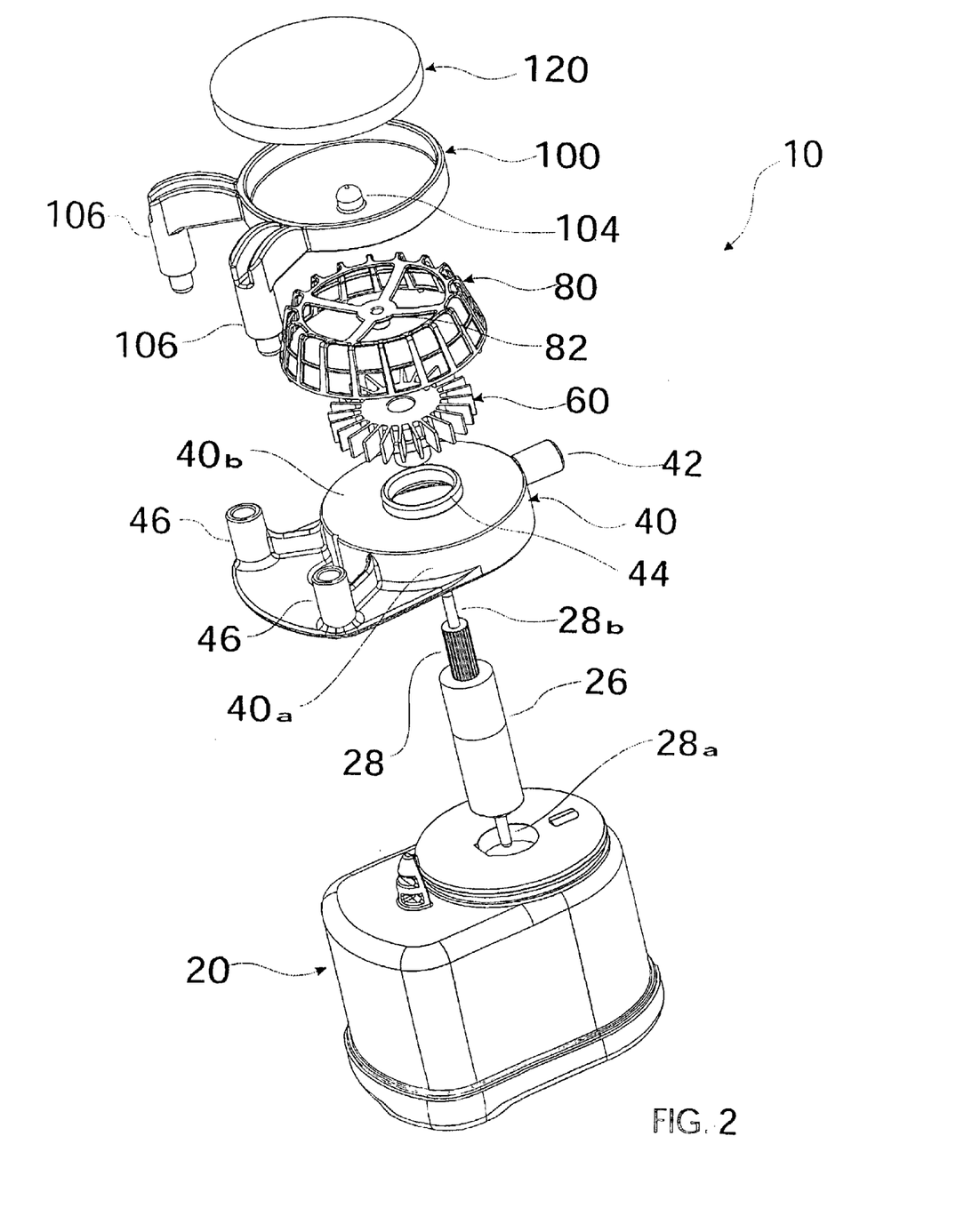
FIGS. 2 and 3 are exploded perspective views of the aerator of FIG. 1.
Figure 3:
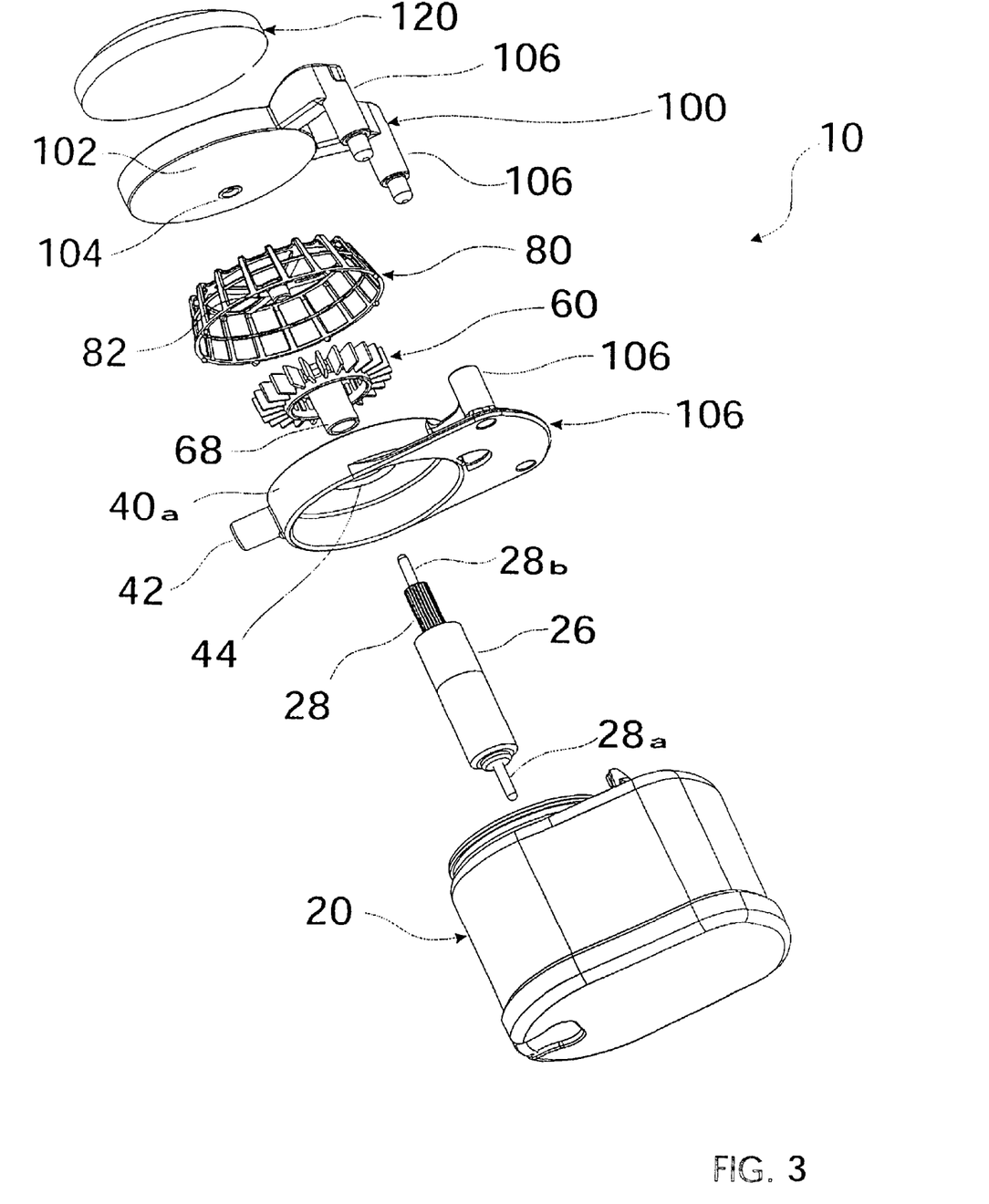
Figure 4:
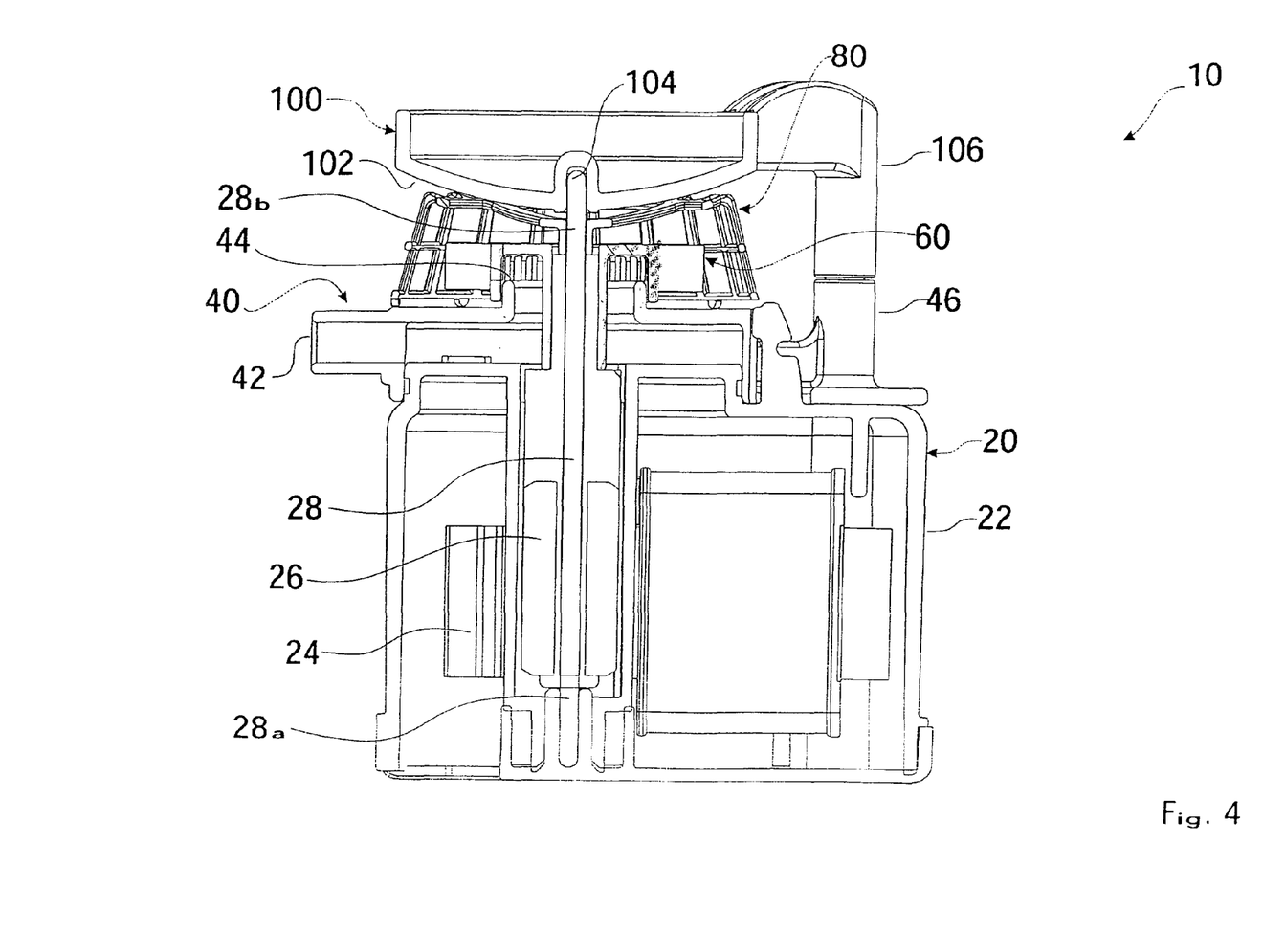
FIG. 4 is a front section of the aerator of FIG. 1.
Figure 5:
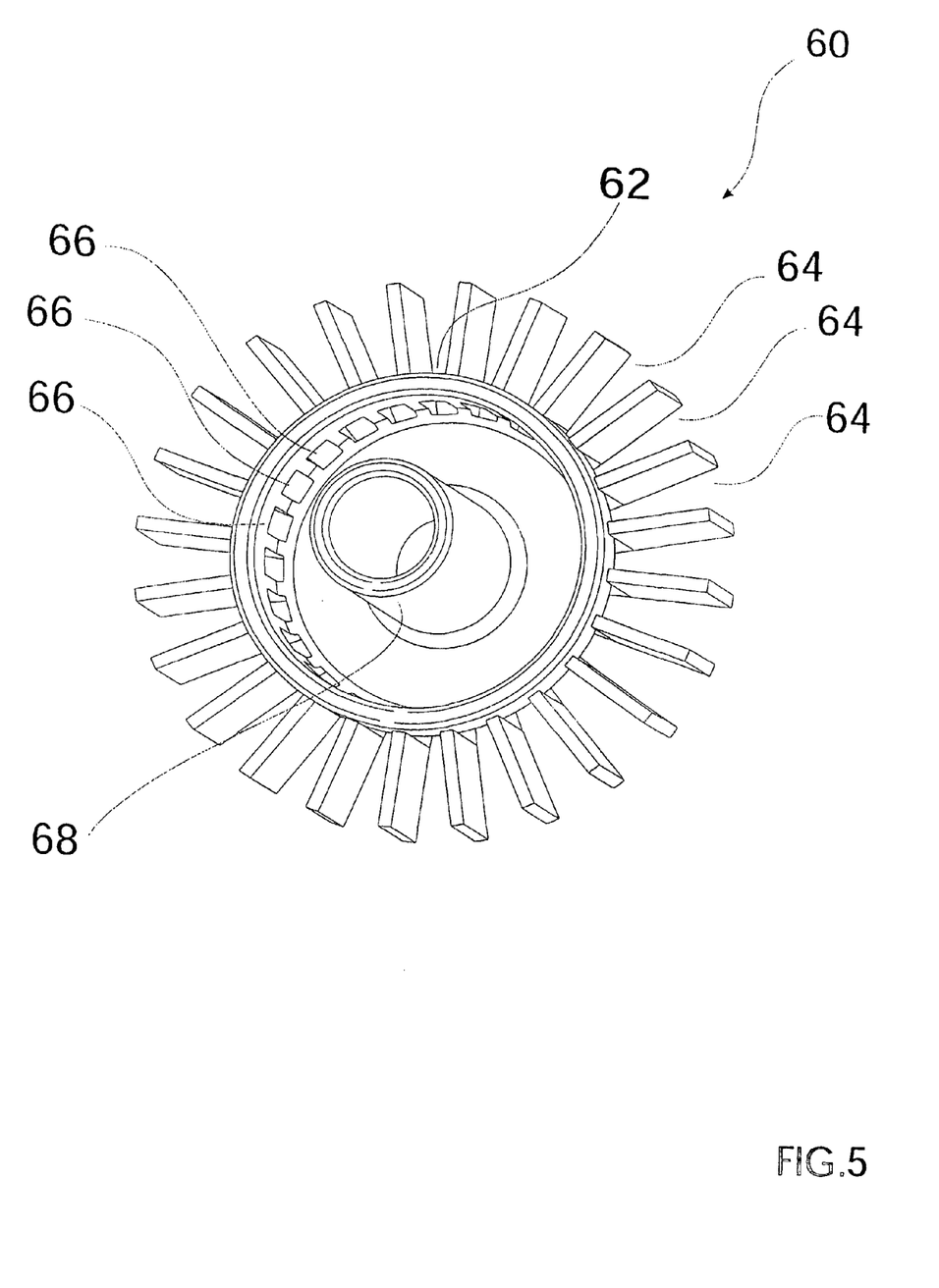
FIG. 5 is a perspective view of the impeller of FIG. 1.

The circular hub 62 is connected to the cylindrical opening 44 of the channelling element 40 and holes 66 are made in it between one blade and the other by means of which air, which arrives inside the hub 62 through the cylindrical opening 44, comes out. A cylindrical hollow support 68 is provided in the central position of the hub 62 inside which the second end 28b of the pin 28 engages, so as to make integral the impeller 60 and the rotor 26. The protective cage 80 is mounted above the impeller 60 in order to prevent dirtiness contained in water from interfering with the proper operation of the impeller 60. The protecive cage 80 in its central position comprises a sleeve 82 inside which the second end 28b of the pin 28 is inserted. Above the protective cage 80, the support element 100 is mounted which is made essentially by a convex cap 102 wherein a hole 104 is made in the central position inside which the second end 28b of the pin 28 is inserted and which functions as a support for the pin 28.

The portion of the protective cage 80 onto which the support element 100 is mounted, is slightly concave so as to house the convex cup 102 of the support element 100. It has been found that the curvature of the convex cup 102 of the support element 100 improves the air flow generated by the impeller 60. The water and air flow generated by the impeller 60 is so conveyed, from one side, by the circular wall 40b of the channelling element 40 and on the other side by the convex cup 102 of the support element 100. The support element 100 has two stems 106 which engage into respective cylindrical support 46 made onto the channelling element 40, so as to fix the support element 100 to the channelling element 40.

Finally, a lighting device 120 is mounted on the inner or cancave side of the convex cup 102 of the support element 100; it has a disc shape containing light leds. The light leds are fed by an electric wire not represented in figures. Also the electric motor 20 is coupled to an electric wire in order to be fed.

The operating of the aerator 10 occurs in the following manner. The air intake 42 is connected to a duct for the passage-way of air and the electric wire which fed the light leds is connected to an electric source and the aerator 10 is then completely immersed inside an aquarium. By feeding the electric motor 20, or better the stator 24, the rotor 26 rotates, then also the pin 28 and the impeller 60 rotate. The rotation of the impeller 60, thanks to the centrifugal effect, pumps the water contained in the aquarium towards the outside of the impeller and, in so doing, it creates a lower pressure in the hub 62. Such a lower pressure draws air through the air intake 42 which enters into the channelling element 40 and then comes out through the cylindrical opening 44 of the channelling element 40. Air enters into the hub 62 of the impeller 60 and comes out from it through the holes 66 made in the hub 62. The blades 64 push the water and air flow inside the aquarium generating many air bubbles which rise upwards and then towards the water surface. The flow of air bubbles allows the water to be oxyginated and improves the exchange of oxygen which occurs on the water surface of the aquarium. The rising of bubbles creates a pleasant visual effect which is better emphasized thanks to the lighting device 120 which lights the rising bubbles, particularly if the light is coloured.

Figure 6:
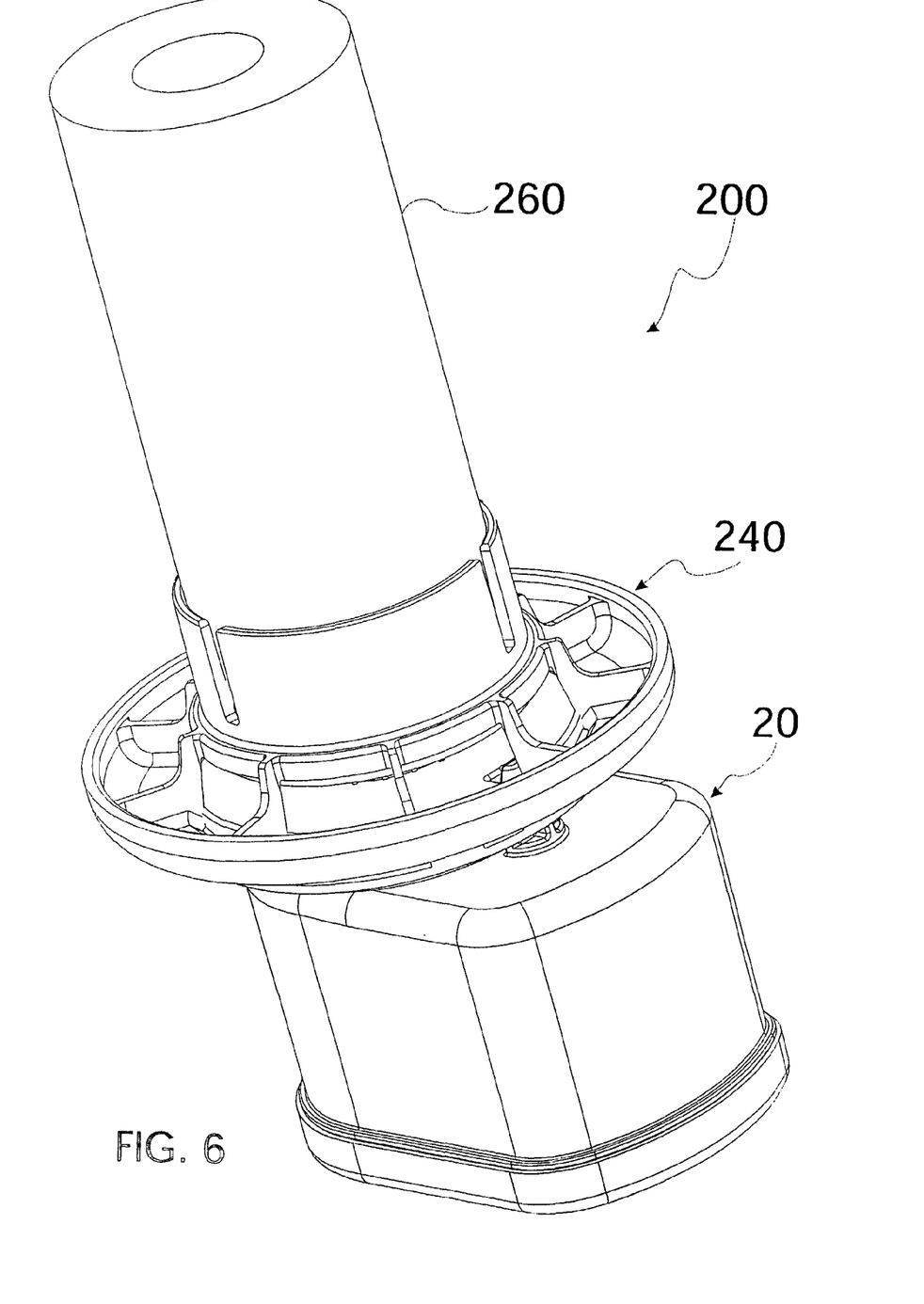
FIG. 6 is a perspective view of an aerator according to a first variant of the invention.
Figure 7:
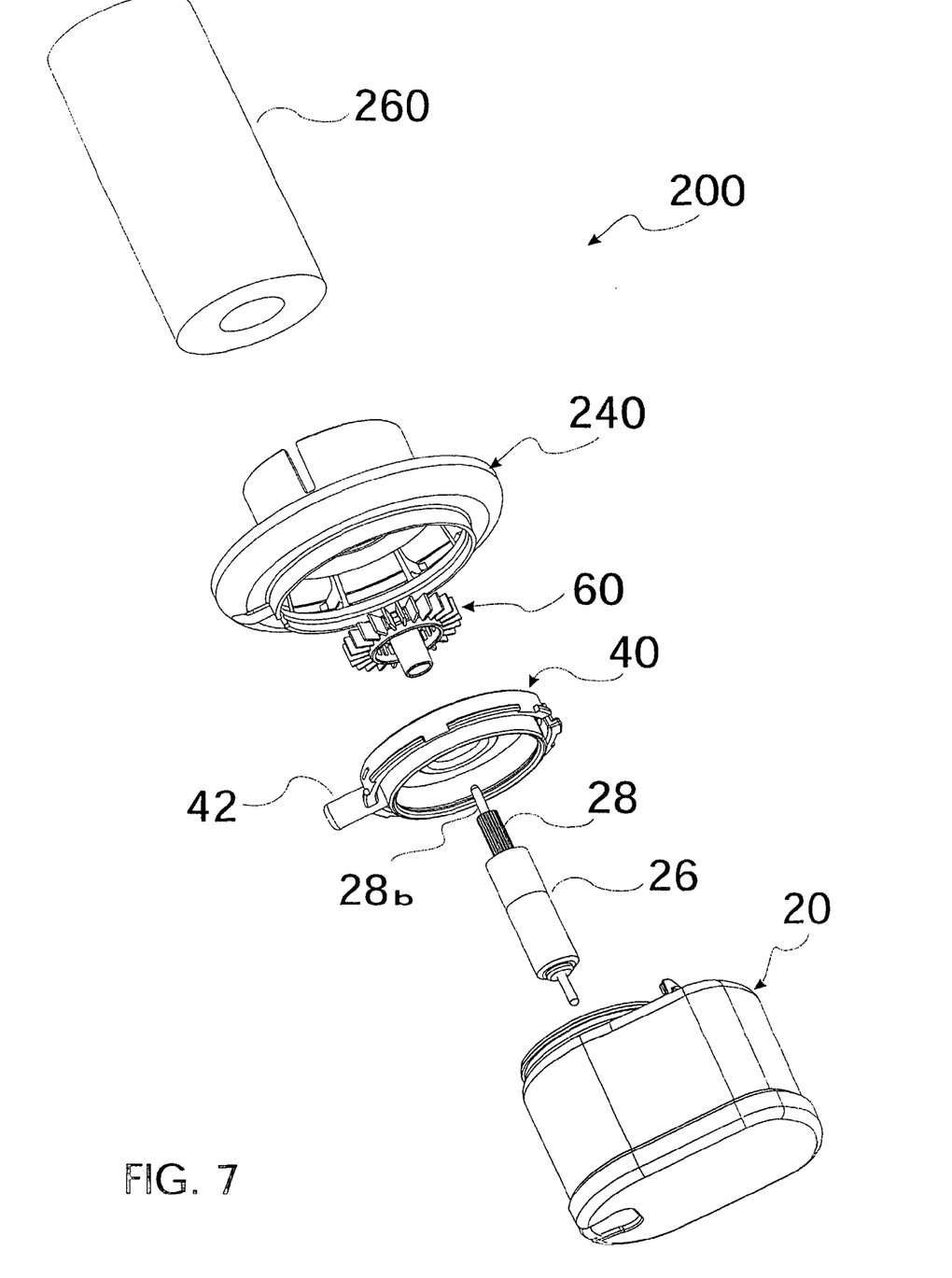
FIG. 7 is an exploded view of the aerator of FIG. 6.
Figure 8:
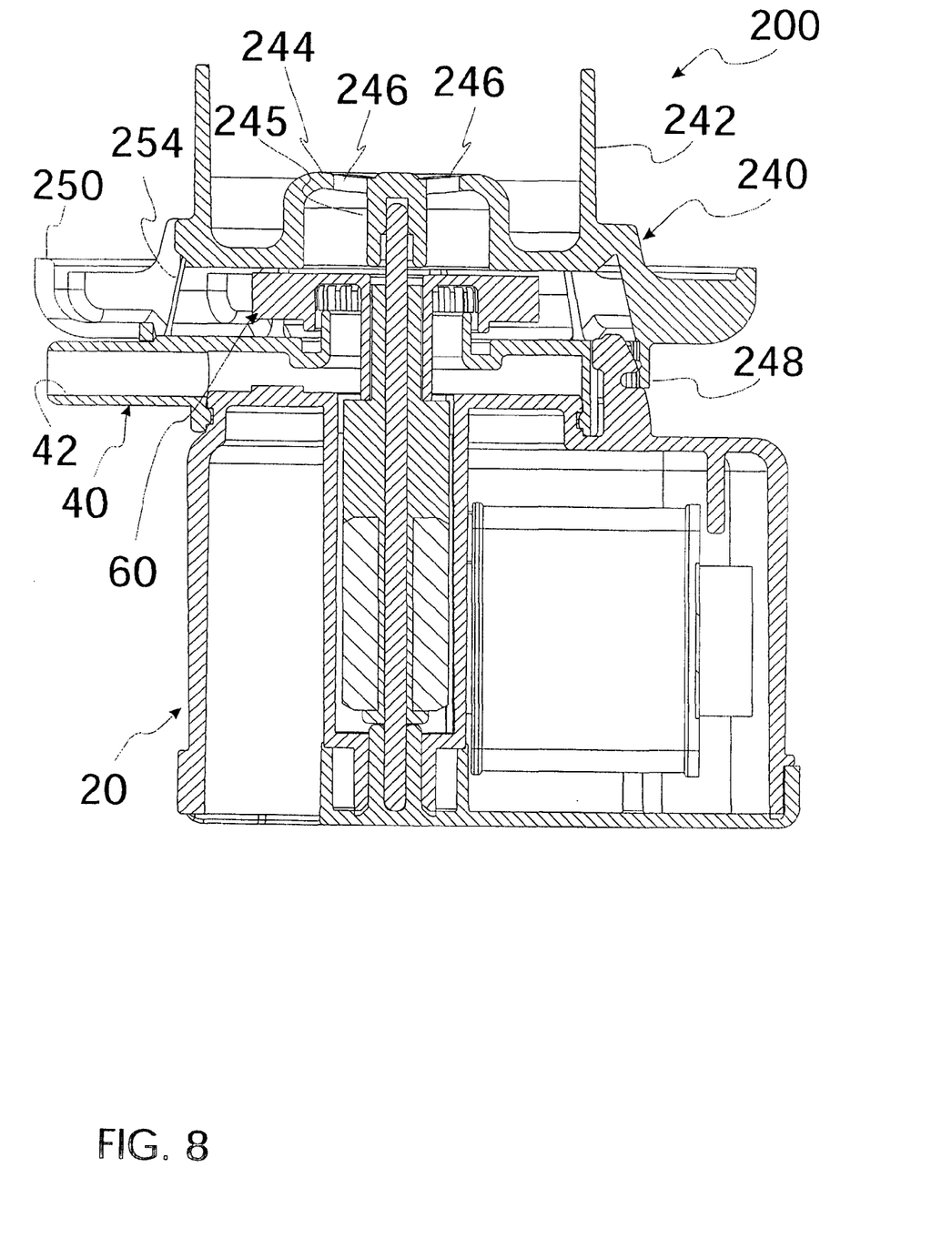
FIG. 8 is a cross-section of the aerator of FIG. 6, without filter.

FIGS. 6 to 8 show a variant of the aerator according to the present invention wherein, for identical or similar elements to those of FIGS. 1 to 5, the same numeral references are used. In these figures an aerator 200 is depicted comprising an electric motor 20, a pin 28 onto which a rotor 26 is mounted, a channelling element 40 having an air intake 42, an impeller 60, a conveying element 240 and a filter 260. The aerator 200 differs from the aerator 10 since the protective cage 80 and the support element 100 are replaced by the conveying element 240 and the filter 260.

Figure 9:
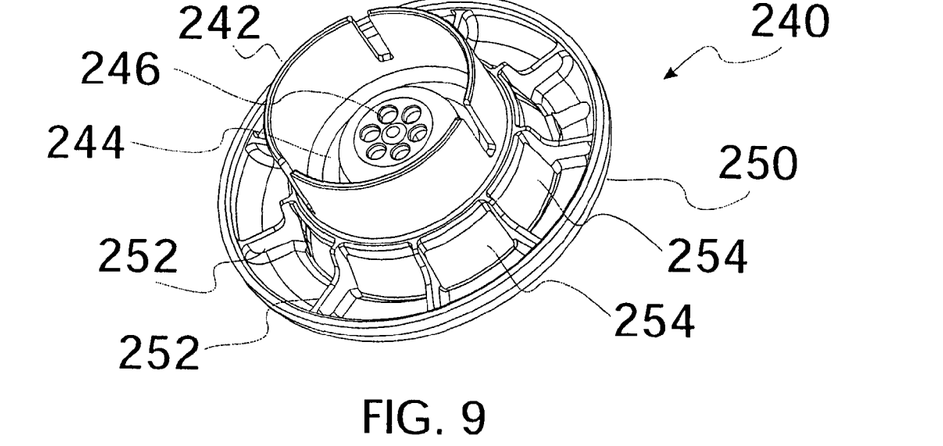
FIG. 9 is a perspective view of the conveying element of the aerator of FIG. 6.
Figure 10:
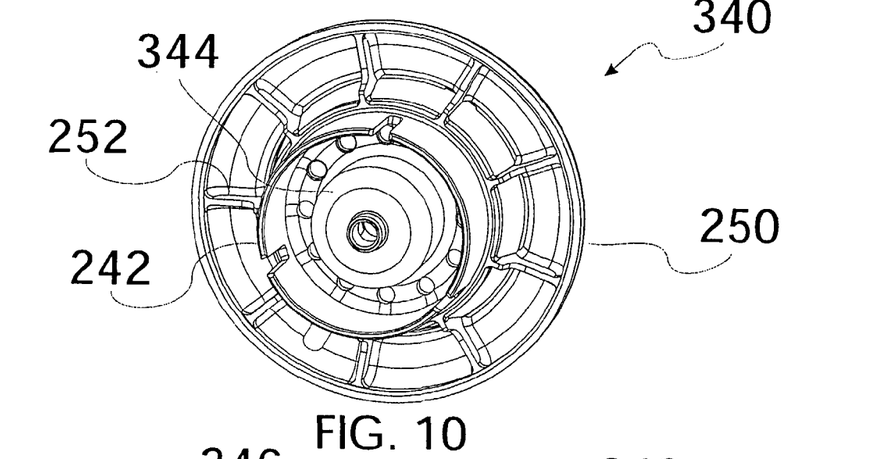
FIGS. 10 and 11 are respectively a perspective view and a cross-section of a variant of the conveying element of FIG. 9.

From FIGS. 8 to 10, it can be noted that the conveying element 240 has a cylindrical structure 242 and, on its bottom, a cylindrical protuberance 244 which has six holes 246 for the intake of water and also a sleeve 245. A circumferential deflector 250 is fixed onto the outside circular end of the bottom of the cylindrical structure 242 which has a paraboloid shape the function of which will be described in the following.

The circumferential deflector 250 is fixed to the cylindrical structure 242 by means of spokes 252 which define between them outlets 254 circularly arranged for the exit of the water and air flow. The conveying element 240 is fixed onto the casing 22 of the electric motor 20 by means of a peg 248 so that the sleeve 245 houses the second end 28b of the pin 28, the impeller 60 is housed inside the deflector 250 and the deflector 250 rests against the channelling element 40. A filter 260 is inserted inside the cylindrical structure 242 having the shape of an hollow cylinder and it is exactly inserted between the cylindrical structure 242 and the cylindrical protuberance 244, inside which passes the water which enters into the impeller 60 passing through the holes 246.

Figure 11:
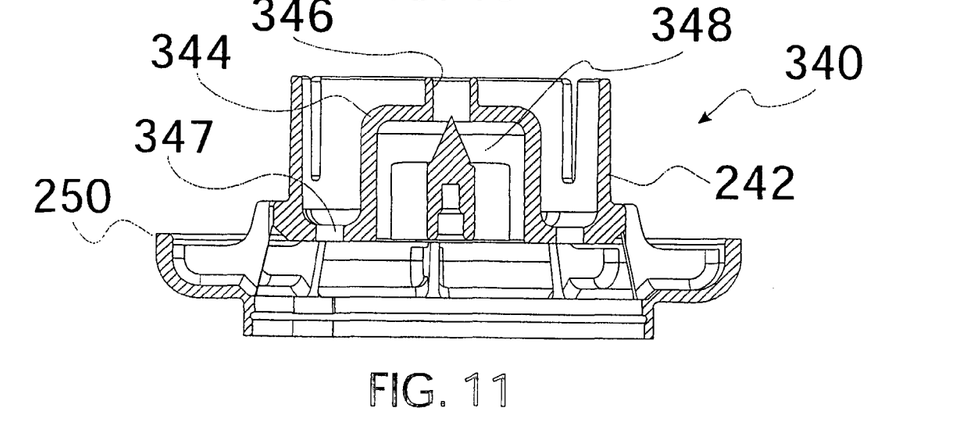

During the operating of the aerator 200, the impeller 60 draws water through the holes 246 which is thrust towards the outlets 254. As already said above, the lower pressure caused by the impeller 60 sucks air from the air intake 42 which, through the holes 66 of the hub 62, arrives to the impeller 60 and mixes with the water. The water and air flow is thrust by the impeller 60 towards the outlets 254 and strikes the deflector 250 whereby, as shown in FIG. 11, the water and air flow which comes out from the impeller 60 is deviated from a direction essentialy perpendicular to the rotation axis of the impeller 60 to a direction comprises between the rotation axis and a direction perpendicular to it. In conclusion, the flow is directed also upwards, so as to improve the rising of the bubbles towards the water surface. The water and air flow which rises passes through the filter 260, so that water is filtered.

FIGS. 10 and 11 represent a variant of the conveying element 240 which in this case is indicated with reference 340 and wherein identical or similar elements to those of the conveying element 240 are indicated with the same numerical references. The conveying element 340 comprises a cylindrical structure 342 onto which a circumferential deflector 250 is fixed by means of spokes 252. A cylindrical protuberance 344 projects inside the cylindrical structure 242 on the top of which a hole 346 is made for the intake of air, whereas holes 347 for the intake of water are made on the bottom of the cylindrical structure 242 between the later and the cylindrical protuberance 344. The cylindrical protuberance 344 defines a chamber 348 for the intake of air which is interposed between the hole 346 and the impeller 60, once the aerator is completely mounted. Therefore, in this case, the channelling element 40 for the intake of water into the impeller 60 is not necessary anymore. Water and air, that previously came into the impeller 60 from opposite sides, now come in from the same side. Since the filter 260 covered the holes 347, the intake water which has to pass through the holes 347 is so filtered.

Figure 12:
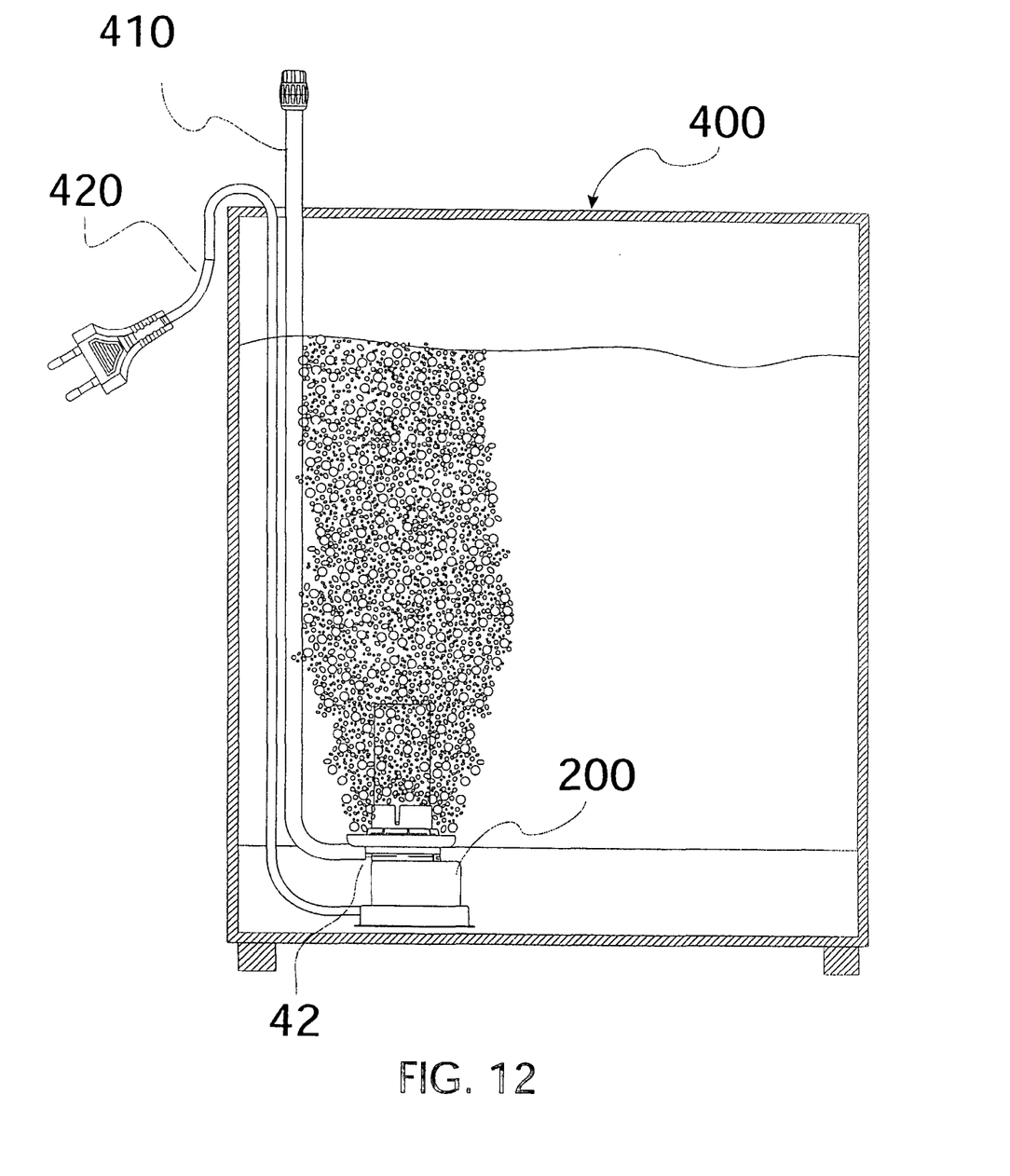
FIG. 12 is a vertical cross-section of an aquarium wherein the aerator of FIG. 6 has been placed.

In FIG. 12, an aquarium 400 is depicted on the bottom of which is placed the aerator 200 with the rotation axis of the impeller vertically arranged. Attached to the aerator 200, there is a duct 410 which connects the outside environment with the air intake 42 and an electric wire 420 for feeding the electric motor 20. Even onto the aerator 200 it is possible to insert a lighting device for lighting the flow of bubbles which rises towards the water surface.

From the previous description it emerges that such aerators are easy to construct and also to mount, thus reducing costs and the construction time. As a consequence, they are very reliable and the required maintenance is minimum.

Thanks to the use of an impeller there are no vibrations and the noise is reduced to a minimum, so these aerators are very quiet. There is no risk that the aerators of the present invention may be blocked, so stopping their proper functioning. Furthermore, the overall dimensions are reduced, thereby they are very compact.

It is evident that changes or variations functionally or conceptually equivalent fall inside the protection field of the present invention. For example, it is possible to make the aerator 10 without the support element 100. In this case, the protective cage 80 is directly fixed in a removable way onto the channelling element 40, and the sleeve 82 of the protective cage 80 functions like a support for the second end 28b of the pin 28. The lighting device 120 is directly fixed onto the protective cage 80. Moreover, the entry of the water, which in the aerator 200 occurs on the side opposite to that of the air with reference to the impeller 60, may be made on the same side, for example due to the use of the conveying element 340. It is also possible to use a number of blades different from that represented in figures. Furthermore, the blades may have a profile which differs from the radial or straight profile, and they can be shaped with a curvilinear profile.

The invention claimed is:

1. An aerator for aquariums and ponds comprising:
    (a) an impeller for pumping water having a rotation axis and provided with a hub from which a plurality of blades connected to the hub extend;
    (b) motor means for operating the impeller, wherein the motor means operates to rotate the impeller about the rotation axis within a casing of the aerator;
    (c) a first entry for intake of water in the impeller;
    (d) a second entry for intake of air, wherein the second entry for intake of air is positioned in an area disposed between the rotation axis of the impeller and the hub of the impeller; and
    (e) an exit where water and air flow comes out from the impeller, wherein the impeller, when operated, sucks water from the first entry, creates a lower pressure that sucks air from the second entry, and mixes the sucked air with water that comes out from the exit, wherein the second entry for intake of air is positioned in an area between the rotation axis of the impeller and a peripheral end of the plurality of blades, wherein in the hub of the impeller there are holes arranged so as to connect an inside of the hub with a space defined between the blades, wherein the inside of the hub is connected to the second entry for intake of air so that, as the impeller rotates, air is drawn inside the hub from the second entry by lower pressure, passes through the holes in the hub and comes out from the impeller through the exit together with the sucked water.

2. An aerator according to claim 1, further comprising a conveying element that surrounds said impeller onto which there is said exit where water and air come out, and said conveying element at said exit is provided with a deflector so as to deviate water and air flow that comes out from the impeller from a direction essentially perpendicular to said rotation axis to a direction positioned between said rotation axis and the direction perpendicular to said rotation axis.

3. An aerator according to claim 2, wherein said conveying element comprises holes that connect said impeller with the outside environment so as to form said first entry for intake of water in said impeller.

4. An aerator according to claim 1, wherein the aerator further comprises a filter positioned near said first entry for the intake of water.

5. An aerator according to claim 1, wherein the aerator further comprises a protective cage placed around said impeller.

6. An aerator according to claim 1, wherein the aerator further comprises a lighting device for lighting said water and air flow.

7. An aerator according to claim 1, wherein said motor means comprises an electric motor.

8. An aerator according to claim 1, wherein said blades are flat and radially arranged with respect to said hub.

9. An aerator according to claim 1, wherein said blades are curvilinear.

10. An aerator according to claim 1, wherein said impeller comprises a number of blades greater than 10.

11. An aerator according to claim 1, wherein the motor means operates to rotate the impeller about the rotation axis within a casing of the aerator.

12. An aerator for aquariums and ponds comprising:
(a) an impeller for pumping water having a rotation axis and provided with a hub from which a plurality of blades connected to the hub extend;
(b) motor means for operating the impeller, wherein the motor means operates to rotate the impeller about the rotation axis within a casing of the aerator;
(c) a first entry for intake of water in the impeller;
(d) a second entry for intake of air, wherein the second entry for intake of air is positioned in an area disposed between the rotation axis of the impeller and the hub of the impeller; and
(e) an exit where water and air flow comes out from the impeller, wherein the impeller, when operated, sucks water from the first entry, creates a lower pressure that sucks air from the second entry, and mixes the sucked air with water that comes out from the exit, wherein the second entry for intake of air is positioned in an area between the rotation axis of the impeller and a peripheral end of the plurality of blades so that mixing of water and air occurs just in the impeller, wherein in the hub of the impeller there are holes arranged so as to connect an inside of the hub with a space defined between the blades, wherein the inside of the hub is connected to the second entry for intake of air so that, as the impeller rotates, air is drawn inside the hub from the second entry by lower pressure, passes through the holes in the hub and comes out from the impeller through the exit together with the sucked water.

13. An aerator for aquariums and ponds comprising:
(a) an impeller for pumping water having a rotation axis and provided with a hub from which a plurality of blades connected to the hub extend;
(b) motor means for operating the impeller, wherein the motor means operates to rotate the impeller about the rotation axis within a casing of the aerator;
(c) a first entry for intake of water in the impeller;
(d) a second entry for intake of air, wherein the second entry for intake of air is positioned in an area disposed between the rotation axis of the impeller and the hub of the impeller; and
(e) an exit where water and air flow comes out from the impeller, wherein the impeller, when operated, sucks water from the first entry, creates a lower pressure that sucks air from the second entry, and mixes the sucked air with water that comes out from the exit, wherein the second entry for intake of air is positioned in an area between the rotation axis of the impeller and a peripheral end of the plurality of blades so that mixing of water and air occurs just in the impeller, wherein in the hub of the impeller there are holes arranged so as to connect an inside of the hub with a space defined between the blades, wherein the inside of the hub is connected to the second entry for intake of air so that, as the impeller rotates, air is drawn inside the hub from the second entry by lower pressure, passes through the holes in the hub and comes out from the impeller through the exit together with the sucked water, and
wherein in the hub of the impeller the holes arranged so as to connect the inside of the hub with the space defined between the blades include one hole arranged between two adjacent blades.

14. An aerator according to claim 13, wherein each blade extends radially from the hub, and the holes arranged in the hub so as to connect the inside of the hub with the space defined between the blades include one hole arranged between each pair of adjacent blades.

15. An aerator for aquariums and ponds comprising:
(a) an impeller for pumping water having a rotation axis and provided with a hub from which a plurality of blades connected to the hub extend;
(b) motor means for operating the impeller, wherein the motor means operates to rotate the impeller about the rotation axis within a casing of the aerator;
(c) a first entry for intake of water in the impeller;
(d) a second entry for intake of air, wherein the second entry for intake of air is positioned in an area disposed between the rotation axis of the impeller and the hub of the impeller;
(e) an exit where water and air flow comes out from the impeller, wherein the impeller, when operated, sucks water from the first entry, creates a lower pressure that sucks air from the second entry, and mixes the sucked air with water that comes out from the exit, wherein the second entry for intake of air is positioned in an area between the rotation axis of the impeller and a peripheral end of the plurality of blades so that mixing of water and air occurs just in the impeller, wherein in the hub of the impeller there are holes arranged so as to connect an inside of the hub with a space defined between the blades, wherein the inside of the hub is connected to the second entry, for intake of air so that, as the impeller rotates, air is drawn inside the hub from the second entry by lower pressure, passes through the holes in the hub and comes out from the impeller through the exit together with the sucked water; and
(f) a channelling element that has a cylindrical opening defining the second entry for intake of air and has an air intake, wherein the cylindrical opening connects the air intake to the inside of the hub.

16. An aerator according to claim 15, wherein said cylindrical opening is parallelly and centrally arranged with respect to said rotation axis of said impeller.

17. An aerator according to claim 16, wherein said channelling element comprises a circular wall arranged in a radial direction with respect to the rotation axis of said impeller, and said impeller is positioned near said radial and circular wall of said channelling element so as to convey water and air flow generated by said impeller on one side.

* * * * *